United States Patent [19]
Yamaguchi et al.

[11] Patent Number: 5,525,568
[45] Date of Patent: Jun. 11, 1996

[54] SUPPORTED METALLIC CATALYST AND MANUFACTURING METHOD THEREOF

[75] Inventors: Motoo Yamaguchi, Hitachi; Kenzo Kobayashi, Mito; Takahide Matsuo; Norihira Uozumi, both of Hitachi, all of Japan

[73] Assignee: Hitachi, Ltd., Tokyo, Japan

[21] Appl. No.: 351,177

[22] Filed: Nov. 30, 1994

[30] Foreign Application Priority Data

Dec. 6, 1993 [JP] Japan ................................ 5-304957

[51] Int. Cl.$^6$ ................................ B01J 21/18
[52] U.S. Cl. ................ 502/185; 427/525; 427/523
[58] Field of Search .................. 427/525, 523; 502/185

[56] References Cited

U.S. PATENT DOCUMENTS 4,654,229  3/1987  Morita et al. ................ 427/250
4,703,028  10/1987 Steininger ................... 502/178
5,096,866  3/1992  Itoh et al. ................... 502/185
5,120,699  6/1992  Weiss et al. ................. 502/185

FOREIGN PATENT DOCUMENTS 9301327  1/1993  WIPO ........................ 427/525

Primary Examiner—Asok Pal
Attorney, Agent, or Firm—Antonelli, Terry, Stout & Kraus

[57] ABSTRACT

A method for producing a supported metallic catalyst capable of increasing the number of active points in the metallic catalyst supported at surface of a supporter and of using with high activity and stability, wherein metallic particles in a form of ions or atomic particles composed of several atoms are generated by an ion injecting apparatus, the metallic particles are collided, adsorbed, and supported by the supporter, and the supported metallic catalyst is made by manufacturing the adsorbing sites, and by adsorbing and supporting the metallic catalyst, concurrently.

11 Claims, 5 Drawing Sheets

SUPPORTED METALLIC CATALYST AND MANUFACTURING METHOD THEREOF

BACKGROUND OF THE INVENTION

1. Field of the Invention

The present invention relates to supported metallic catalysts and a manufacturing method thereof, especially, to supported metallic catalysts suitable for highly active electrode catalysts for fuel cells, and highly active oxidation catalysts for hydrocarbon, carbon monoxide etc., and manufacturing method thereof.

2. Description of the Prior Art

An example of conventional supported metallic catalysts and manufacturing methods thereof is shown in FIG. 6 (based on the structure disclosed in JP-A-52-20990 (1977)).

Another example of conventional supported metallic catalysts and manufacturing method thereof is disclosed in JP-A-4-187246 (1992), wherein a method for ion-implanting catalytic metal into a supporter made of metallic plate coated with active alumina. In this case, the catalyst is supported by an insulated supporter such as alumina, and accordingly, electric energy generated by catalytic reaction can not be taken outside the catalyst.

Hereinafter, an outline of the conventional supported metallic catalysts and manufacturing methods thereof is explained referring to FIG. 6 and FIG. 7.

Referring to FIG. 6 and FIG. 7, an ion stream 3 of rare gas such as He, Ne, Ar etc., which is generated at an ion generator is collided with a target metal 9 for sputtering metal at surface layer of the target metal 9. At the same moment, electric charges possessed by the rare gas ions are directed to ground through the supporter 8 of the target metal 9, and are neutralized by discharging. The discharging current is monitored by an ammeter 11 as an ion current. At this time, the majority of kinetic energy of the ion stream 3 is exhausted by the sputtering operation.

The neutral sputtering particle stream 10 generated at the target metal 9 adheres to the surface of supporter 5 with a very weak kinetic energy, and forms a supported metallic catalyst by coating the crystal surfaces of the supporter atoms 14 with the catalytic metal 12 as shown in FIG. 7.

However, the supported catalyst manufactured by the above described conventional method has a structure wherein the surface of the supporter is covered with the catalytic metal 12, that means, the supporter is covered with many ineffective catalytic metal atoms which have no activity as catalyst because active points, which are areas having actual catalytic activity, are crystal defects and structural deficiencies. Essentially, the number of the active points in the conventional supported metallic catalyst is as same as the number of the active points existing in the metallic catalyst having the same structure as the supporter, that is, catalytic performance per unit supporter volume is not improved.

Even if the coating of the supporter is performed partially, it does not necessarily mean coating only effective portions which have the catalytic activity, and a fraction of the portion having the catalytic activity to total coating area of catalytic metal is the same as that of the total coating process.

Rather, the above partial coating decreases the number of the active points per unit of supporter, and reversely lowers the catalytic performance.

Further, the supported catalyst having the structure wherein the supporter is coated with the catalytic metal in accordance with the conventional manufacturing method has a weak adsorbing strength because the supporter and the catalytic metal is bonded only by adherence at surfaces of the supporter and the catalytic metal.

Furthermore, even though a defect exists at the supporter atoms 14 at first, the catalytic metal atoms 12 are adhered to the surface along the defect by spattering as shown in FIG. 8. When any effect of temperature and electric potential is applied to the catalytic metal, the catalytic metal atoms 12 existing at the vicinity of the defect 15 move to the adsorbing site 16, that is the defect existing at the surface of the supporter at first, and gather to generate sintering phenomenon as shown in FIG. 9. As the result, problems such as lowering catalytic performance of the catalytic metal and shortening life of the catalytic metal are caused.

In order to prevent the catalytic metal from sintering, there is a method wherein the adsorbing site is made chemically. However, increasing the number of the adsorbing sites has restriction because the adsorbing sites are generated collectively at weak points of the supporter surface, and it is difficult to make the adsorbing sites homogeneously over the whole surface of the supporter. Accordingly, the number of the active points could not be increased, and there was a limit in improving the catalytic performance.

SUMMARY OF THE INVENTION

(1) Objects of the Invention

Object of the present invention is to provide a supported metallic catalyst capable of increasing the number of the active points in the catalytic metal supported at the surface of the supporter and of maintaining high activity for a long time, and a manufacturing method thereof.

(2) Methods of solving the Problems

In order to achieve the above object, the present invention provides a supported metallic catalyst comprising metallic particles of at least one metal having catalytic effect and a supporter to support the metallic particles, which is formed by colliding the supporter made of carbon with the metallic particles in a form of ions, or atomic particles composed of a several atoms to adsorb and support the metallic particles, and a method for manufacturing the supported metallic catalyst comprising metallic particles of at least one metal having catalytic effect and a supporter to support the metallic particles, wherein the metallic particles are supplied by an ion injecting apparatus in a form of ions, or atomic particles composed of a several atoms, and the metallic particles are collided, adsorbed, and supported by the supporter made of carbon.

In accordance with the present invention, the catalytic metal is collided and adhered to the supporter made of carbon in a form of ions, or atomic particles composed of a several atoms generated by an ion injecting apparatus.

Generally, an ion generator of mass separation type such as an ion injecting apparatus generates the catalytic metal ions having electric charge. Therefore, adhesiveness of the catalytic metal with the supporter can be improved by giving reverse electrical charge to the supporter. Further, velocity of the catalytic metal ions to collide to the supporter, that is kinetic energy, can be controlled by adjusting electrical potential of the supporter.

As stated above, the catalytic metal collides to the supporter with a large kinetic energy, and accordingly, the catalytic metal is adsorbed by replacing surface metal of the supporter.

The adsorbed metal forms a stable crystalline particle at the supporter surface. At the moment, the supported crystalline metallic particles are not only adhered to the supporter surface, but the catalytic metal ions are adsorbed to the supporter in a form of replacing the atoms 13 at the supporter surface layer as shown in FIG. 5. That means both forming the so-called adsorbing sites and the adsorption are performed concurrently.

The number of the contacting boundaries 17 of the supporter with the adsorbed catalytic metal at the adsorbing sites of the supporter increases more than the number of the contacting boundaries of the case when the catalytic metal only adheres to the supporter as shown in FIG. 7. By heat treatment such as annealing, the catalytic metal combines with the supporter by lattice bonding of the boundary atoms, and forms active points which have tight structures not to desorb the catalytic metal easily.

In accordance with the collision-adsorption wherein the adsorption is performed concurrently with forming the adsorbing sites in atomic order as explained above, the adsorption can be a stable adsorption, the active points can be formed anywhere at the surface of the supporter, and the number of the active points can be increased. As the result, catalytic performance can be improved. By colliding and being adsorbed at least two kinds of catalytic metals, a supported alloy catalyst can be manufactured in the same manner as described above.

DETAILED DESCRIPTION OF THE EMBODIMENTS

Embodiment 1

One of the embodiments of the present invention is explained hereinafter referring to FIGS. 1–3.

Figure 1:
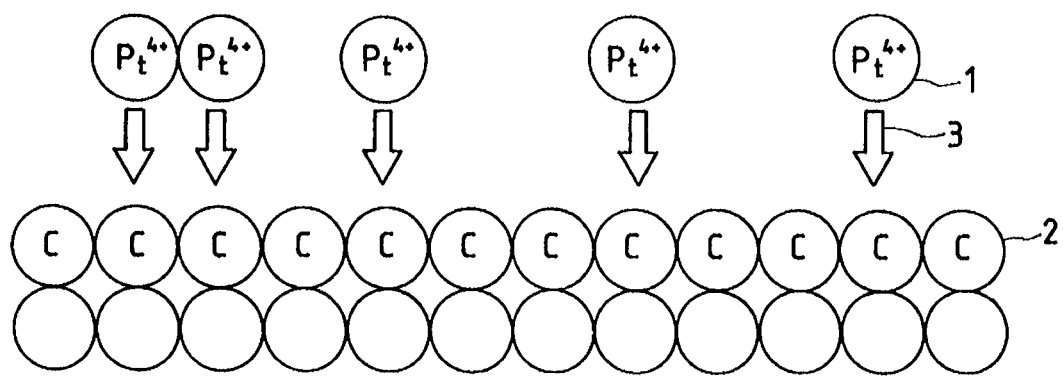
FIG. 1 is a schematic cross section of the supported metallic catalyst of the present invention illustrating a structure at surface of the catalyst before adsorbing platinum atoms to the supporter made of carbon.

FIG. 1 is a schematic cross section of the supported metallic catalyst of the present invention illustrating a structure at surface of the catalyst before adsorbing platinum atoms to the supporter made of carbon.

Figure 10:
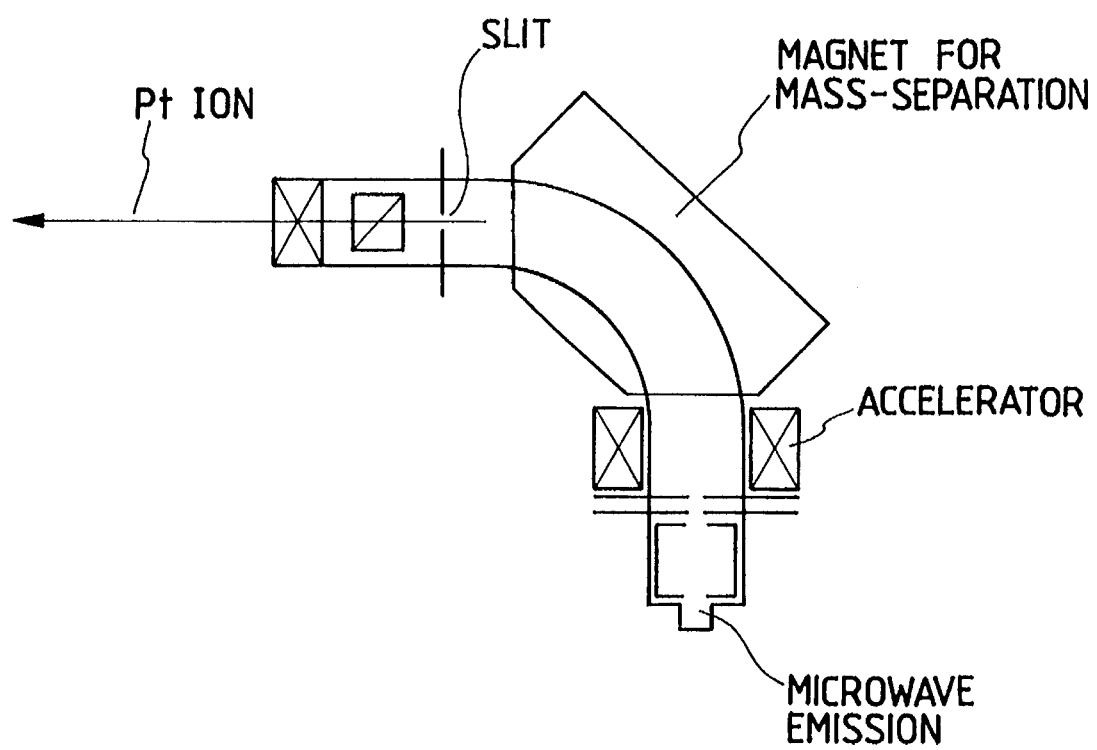
FIG. 10 is a schematic illustration indicating composition of an ion injecting apparatus.

Platinum plasma was generated by an ion injecting apparatus shown in FIG. 10, and was taken out from the apparatus in a form of atomic platinum ions 1 as shown in FIG. 1. Referring to FIG. 1, the platinum ions 1 were accelerated along the ion stream 3 with an accelerating voltage of 100 kV and collided with carbon supporter atoms 2 at surface layer of acetylene black (made by Denki Kagaku, Denkablack) used for a supporter made of carbon.

Figure 2:
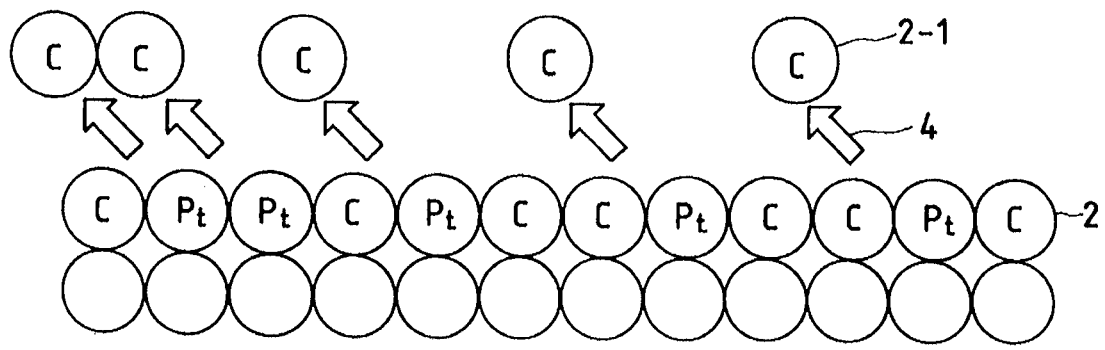
FIG. 2 is a schematic cross section of the supported metallic catalyst of the present invention illustrating a structure at surface of the catalyst after being collided and adsorbing atomic platinum ions to the supporter made of carbon subsequent to the state shown in FIG. 1.

Subsequently, the platinum ions 1 collided with the supporter made of carbon and were absorbed as shown in FIG. 2, a part of the carbon supporter atoms 2 at surface layer were released and scattered in a released carbon scattering direction 4 as released carbon atoms 2-1. The supported catalyst was formed so as to make the platinum particle weight calculated from an accumulated value of the ion current 1/10 of the weight of the supporter made of carbon.

Next, polyfuron dispersion liquid was prepared by adding distilled water 5 parts by weight to polyfuron dispersion (made by Daikin Kogyo Co., D-1, solid content 60%) 1 part by weight, and adjusting to solid content 10%. Subsequently, 10 parts by weight of the 10% polyfuron dispersion liquid and the previously prepared supported catalyst were mixed and agitated, and the mixture was applied to a carbon fiber sintered electrode, drying at 110° C. for one hour, and the electrode was prepared by heat treatment at 350° C.

Using the above described electrode, catalytic activity of the electrode was determined in comparison with an electric potential of hydrogen electrode using phosphoric acid at 200° C. as an electrolyte, and obtained mass activity of 75 (mA/mgPt) at 900 mV. The obtained value revealed that the catalyst obtained by the present invention was improved in performance by 1.5 comparing with the conventional Pt/C catalyst disclosed in K. Tsurumi et al: Stability of phosphoric acid fuel cell electrocatalysts, Fuel Cell Seminar Abstracts. 342 (1990).

Any mixing of the supported metallic catalyst with noble metals and other metals having catalytic activity such as gold, silver, palladium, ruthenium, rhodium etc., and further, with a combination of these metals, and with a combination of these noble metals with at least a kind of co-catalytic metals including iron, nickel, cobalt, chromium, iridium, gallium, titanium, vanadium, aluminum does not change the advantages of the catalyst of the present invention.

Figure 3:
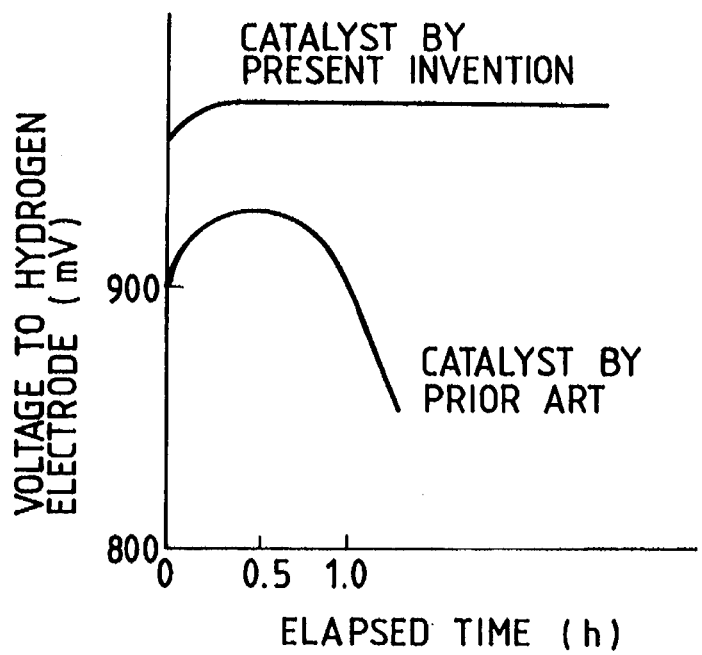
FIG. 3 is a graph indicating comparison of performance of the supported metallic catalysts made by the present invention and by the prior art.

In FIG. 3, a result of an electric potential measurement in comparison with a hydrogen electrode is indicated, wherein changes of electric potentials are determined by obtaining a necessary current to make the electric potential of the conventional catalyst at 900 mV first, then, the necessary current is charged to the catalysts both of the present invention and the prior art, and the catalysts are maintained at the same condition for a several hours. During the above maintained period, the electric potential of the catalysts was determined at a constant intervals.

FIG. 3 reveals that the electric potential of the catalyst manufactured by the prior art deceases rapidly after elapsing 30 minutes, while, the electric potential of the Pt/C catalyst manufactured by the present invention does not decrease even after elapsing 30 minutes, and the Pt/C catalyst has stable performance.

Embodiment 2

Figure 4:
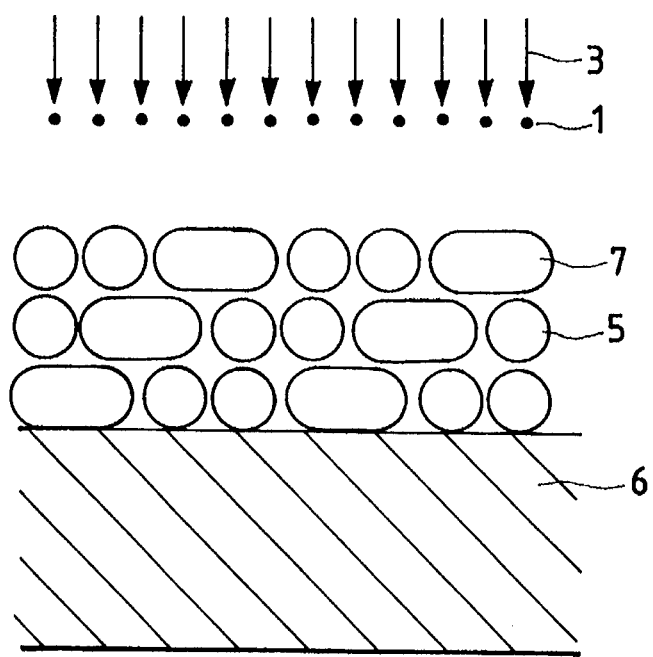
FIG. 4 is a schematic cross section of the supported metallic catalyst indicating another embodiment of the present invention.
Figure 5:
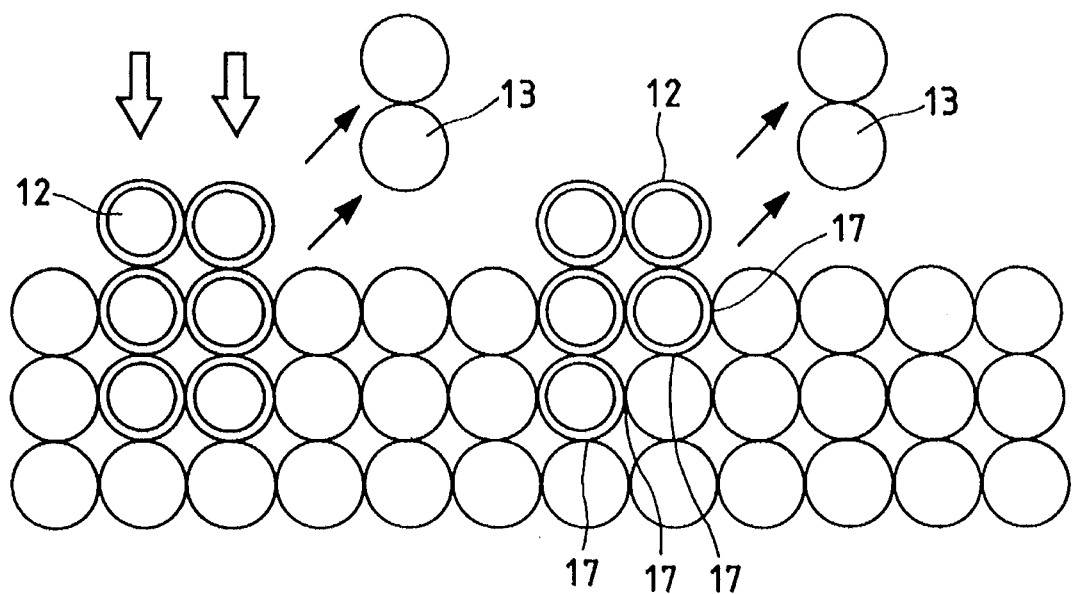
FIG. 5 is a schematic cross section of the supported metallic catalyst indicating further another embodiment of the present invention.
Figure 6:
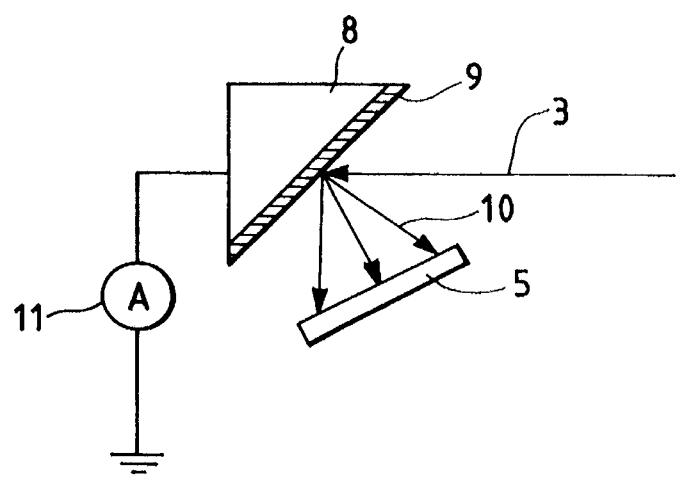
FIG. 6 is a schematic illustration indicating an example of conventional manufacturing method of the supported catalyst.
Figure 7:
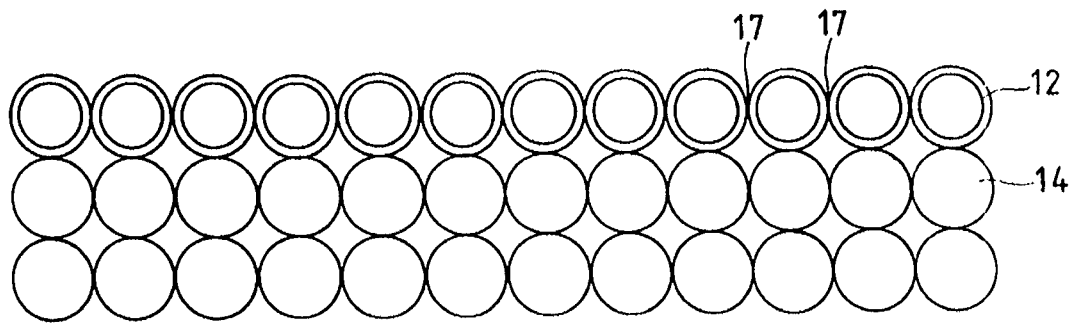
FIG. 7 is a schematic cross section of an example of the conventional supported catalyst.
Figure 8:
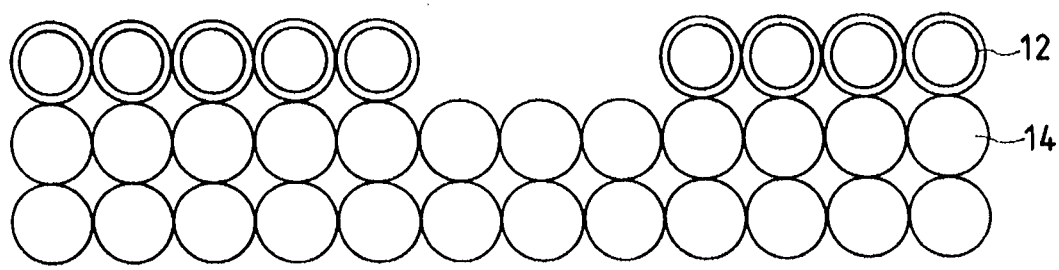
FIG. 8 is a schematic cross section of another example of the conventional supported catalyst.
Figure 9:
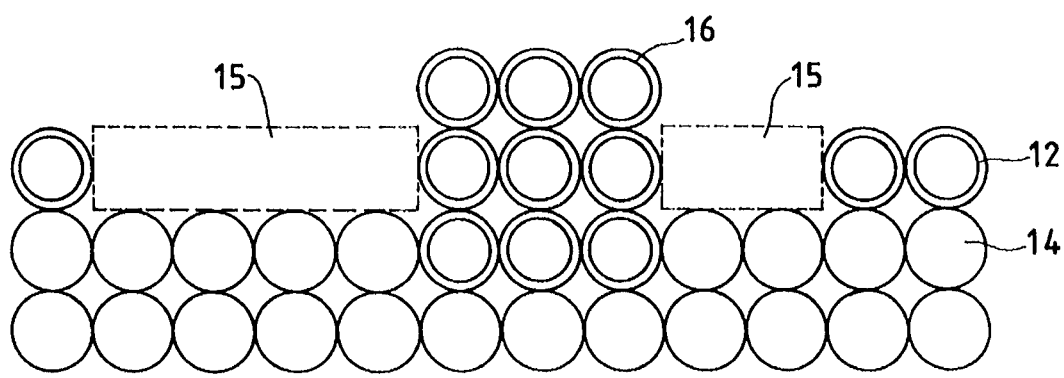
FIG. 9 is a schematic cross section of further another example of the conventional supported catalyst.

Referring to FIG. 4, a structure composed of carbon supporter particles 5 and polyfuron adhesive 7 on a catalyst supporting substrate 6 is prepared by mixing and agitating acetylene black (made by denki Kagaku Co., Denkablack) as for the supporter particles 5 and 10% polyfuron dispersion liquid described in claim 1 by 1:10, applying the mixture to a carbon fiber sintered electrode as for the catalyst supporting substrate 6, and drying the applied catalyst supporting substrate 6.

Subsequently, platinum plasma was generated by an ion injecting apparatus shown in FIG. 10 in the same manner as claim 1, and was taken out from the apparatus in a form of atomic platinum ions 1. The atomic platinum ions 1 were accelerated along the ion stream 3 with an accelerating voltage of 100 kV, and collided and adsorbed with the catalyst supporting substrate 6 applied with the carbon supporter particles 5. The amount of adsorbed platinum was determined by the same method as claim 1. Then, the electrode was prepared by heat treatment at 350° C.

Using the above described electrode, catalytic activity of the electrode was determined in comparison with an electric potential of hydrogen electrode using phosphoric acid at 200° C. as an electrolyte, and obtained mass activity of 75 (mA/mgPt) at 900 mV. The obtained value revealed that the catalyst obtained by the present invention was improved in performance by 1.5 in comparison with the conventional Pt/C catalyst as well as claim 1.

As explained above, the catalytic metal can be supported and adsorbed with forming adsorbing sites by colliding, adsorbing, and supporting the catalytic metal to the supporter in a form of ions. As the result, the number of active points formed, which generate catalytic activity, can be increased to the same number as the number of the collided ions at maximum. Accordingly, in comparison with the conventional method wherein the adsorbing sites are chemically formed previously at the supporter, the method of the present invention can increase the number of the adsorbing sites, that is, the number of the active points, and performance of the catalyst can be improved as much as the increased number of the active points.

Further, the supported position necessarily becomes the adsorbing site. Accordingly, strength of the adherence between the catalytic metal and the supporter can be increased, and stable performance of the catalyst can be maintained.

Furthermore, by using electroconductive particles such as carbon as the supporter, electric energy generated by the catalytic reaction can be taken out stably from the catalyst.

What is claimed is:

1. A supported metallic catalyst comprising metallic particles of at least one metal having catalytic effect, and a supporter for supporting said metallic particles, formed by colliding metallic particles comprised of ions or atomic particles composed of several atoms of the metal, to the supporter made of carbon for adsorbing and supporting of said metallic particles.

2. A supported metallic catalyst comprising metallic particles of at least one metal having catalytic effect, and a supporter for supporting said metallic particles, formed by colliding metallic particles which include at least one noble metal having catalytic effect and being selected from the group consisting of platinum, gold, silver, palladium, ruthenium, and rhodium in a form of ions, or atomic particles composed of several atoms of the metal, to the supporter made of carbon for adsorbing and supporting of said metallic particles.

3. A supported metallic catalyst comprising metallic particles of at least one metal having catalytic effect, and a supporter for supporting said metallic particles, formed by colliding metallic particles which include at least one noble metal having catalytic effect and being selected from the group consisting of platinum, gold, silver, palladium, ruthenium, and rhodium, and at least one co-catalytic metal selected from the group consisting of iron, nickel, cobalt, chromium, iridium, gallium, titanium, vanadium, and aluminum in a form of ions, or atomic particles composed of several atoms of the metal, to the supporter made of carbon for adsorbing and supporting of said metallic particles.

4. A supported metallic catalyst comprising metallic particles of at least one metal having catalytic effect supported by a supporter, wherein said metallic particles are supplied in a form of ions, or particles composed of several atoms of a metal by an ion injecting apparatus for colliding to the supporter made of carbon for adsorbing and supporting of said metallic particles.

5. A method for manufacturing a supported metallic catalyst comprising metallic particles of at least one metal having catalytic effect supported by a supporter, wherein said metallic particles including at least one noble metal having catalytic effect and being selected from the group consisting of platinum, gold, silver, palladium ruthenium, and rhodium are supplied in a form of ions, or atomic particles composed of several atoms of a metal by an ion injecting apparatus for colliding to the supporter made of carbon for adsorbing and supporting of said metallic particles.

6. A method for manufacturing a supported metallic catalyst comprising metallic particles of at least one metal having catalytic effect supported by a supporter, wherein said metallic particles including at least one noble metal having catalytic effect and being selected from the group consisting of platinum, gold, silver, palladium ruthenium, and rhodium, and at least one co-catalytic metal selected from the group consisting of iron, nickel, cobalt, chromium, iridium, gallium, titanium, vanadium, and aluminum, are supplied in a form of ions, or atomic particles composed of several atoms of a metal by an ion injecting apparatus for colliding to the supporter made of carbon for adsorbing and supporting of said metallic particles.

7. A method for manufacturing a supported metallic catalyst as claimed in any of claims 9–11, comprising the steps of holding said supporter by a supplementary substrate, and colliding and adsorbing said metallic particles in a form of ions to the supporter by an ion injecting apparatus.

8. A method for manufacturing a supported metallic catalyst as claimed in claim 7, wherein a means for holding said supporter by the supplementary substrate is a ceramic or high polymer adhesive agent.

9. A method for manufacturing a supported metallic catalyst as claimed in claim 8, wherein said high polymer adhesive agent is a fluorine resin.

10. A supported metallic catalyst as claimed in any one of claims 1, 2, 3, 4, 5, or 6, wherein the metallic particles adsorbed onto the supporter replace surface atoms of the supporter.

11. A method for manufacturing a supported metallic catalyst as claimed in any one of claims 4–6, wherein the metallic particles adsorbed onto the supporter replace surface atoms of the supporter.

* * * * *